United States Patent [19]

Haas, Jr.

[11] Patent Number: 4,507,867

[45] Date of Patent: Apr. 2, 1985

[54] CABLE SHEATH CUTTER KNIFE

[76] Inventor: Anton J. Haas, Jr., 6602 Spencer, Omaha, Nebr. 68104

[21] Appl. No.: 513,420

[22] Filed: Jul. 14, 1983

[51] Int. Cl.³ .............................................. B26B 3/08
[52] U.S. Cl. ....................................... 30/90.4; 30/314
[58] Field of Search ........................ 30/90.1, 90.4, 314, 30/317, 353

[56] References Cited

U.S. PATENT DOCUMENTS

| 1,282,322 | 10/1918 | Trepto | 30/353 |
| 1,380,008 | 5/1921 | Otto | 30/314 X |
| 1,843,223 | 2/1932 | Hasseler | 30/353 |
| 1,988,386 | 1/1935 | Komperud | 30/353 |
| 2,348,429 | 5/1944 | Walker | 30/353 |
| 2,517,840 | 8/1950 | Chatlos | 30/353 |
| 2,649,860 | 8/1953 | Royer | 30/353 |
| 2,873,523 | 2/1959 | Garland et al. | 30/317 |
| 3,162,945 | 12/1964 | Stabs | 30/90.4 |
| 3,918,158 | 11/1975 | Debski | 30/317 X |
| 4,198,751 | 4/1980 | Egbert | 30/286 |
| 4,283,854 | 8/1981 | Austin | 30/314 |

Primary Examiner—Jimmy C. Peters
Attorney, Agent, or Firm—Zarley, McKee, Thomte, Voorhees & Sease

[57] ABSTRACT

A cable sheath cutter knife for use in slicing through the aluminum and steel layers covering telephone cables. The knife includes a pointed end portion which in initially extended through the aluminum and steel sheaths or layers. The knife is then rotated downwardly about the pointed end to properly position the knife. The knife is then pulled longitudinally relative to the cable with a cutting edge on the knife slicing through the aluminum and steel layers. The knife is also designed to limit the penetration of the cutting portions into the cable.

5 Claims, 13 Drawing Figures

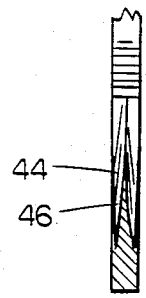
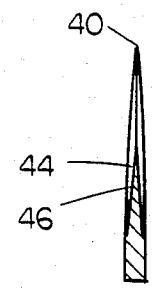
FIG. 6  FIG. 7
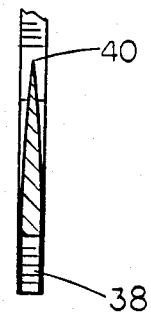
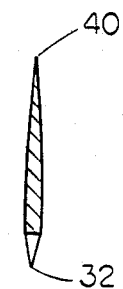
FIG. 8  FIG. 9
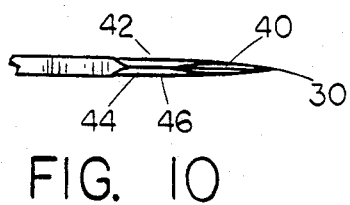
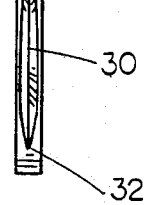
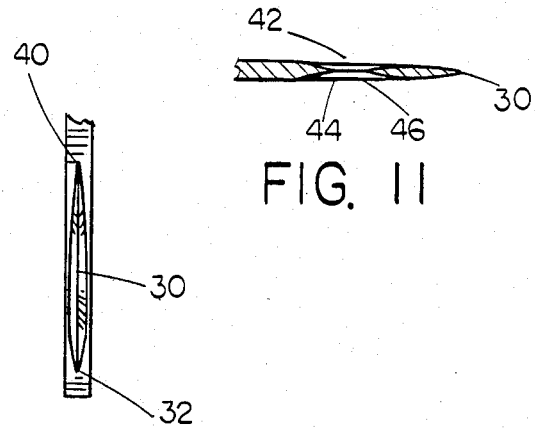
FIG. 10  FIG. 12  FIG. 11

CABLE SHEATH CUTTER KNIFE

BACKGROUND OF THE INVENTION

In the telephone business, cables are frequently utilized and it is necessary to splice the ends of cables together. The telephone cables normally comprise a thick layer of rubber on the outside with a corrugated aluminum layer therebelow which is approximately 0.006 inches thick. A layer of steel with a thickness of 0.008 inches is positioned beneath the corrugated aluminum. A layer of paper is positioned between the steel layer and the wires enclosed within the cable. In order to splice the cables together, it is necessary to remove the rubber, steel, aluminum and paper. Heretofore, the task was extremely time consuming inasmuch as there has not been an efficient way for removing the steel and aluminum layers. The conventional way of removing the steel and aluminum layers was to use a pair of shears, side cutters, etc. in an attempt to longitudinally cut through the steel and aluminum layers and to then somehow remove the material from the cable.

Therefore, it is a principal object of the invention to provide a telephone cable sheath cutter knife.

A further object of the invention is to provide a cable sheath cutter knife which greatly facilitates the removal of the aluminum and steel layers from a telephone cable.

A further object of the invention is to provide a cable sheath cutter knife which is easy to use.

Still another object of the invention is to provide a cable sheath cutter knife which includes means for initially penetrating the steel and aluminum layers and including means for limiting the depth of the cut of the knife.

Yet another object of the invention is to provide a cable sheath cutter knife which is safe to use.

These and other objects will be apparent to those skilled in the art.

BRIEF DESCRIPTION OF THE DRAWINGS

FIG. 6 is an enlarged sectional view taken on lines 6—6 of FIG. 1:

FIG. 7 is an enlarged sectional view taken on line 7—7 of FIG. 2:

FIG. 8 is an enlarged sectional view taken on lines 8—8 of FIG. 2:

FIG. 9 is an enlarged sectional view taken on lines 9—9 of FIG. 1:

FIG. 10 is an enlarged sectional view taken on lines 10—10 of FIG. 2:

FIG. 11 is an enlarged sectional view taken on lines 11—11 of FIG. 2; and

FIG. 12 is an enlarged sectional view taken on lines 12—12 of FIG. 2.

SUMMARY OF THE INVENTION

Figure 1:
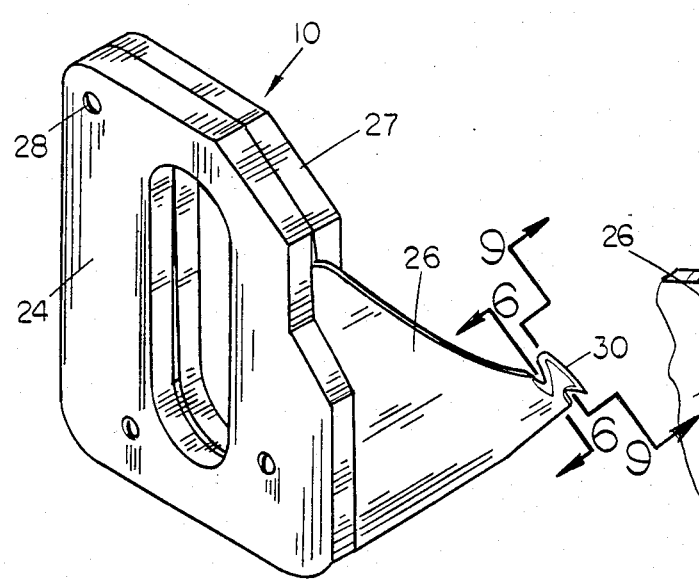
FIG. 1 is a perspective view of the knife of this invention.
Figure 2:
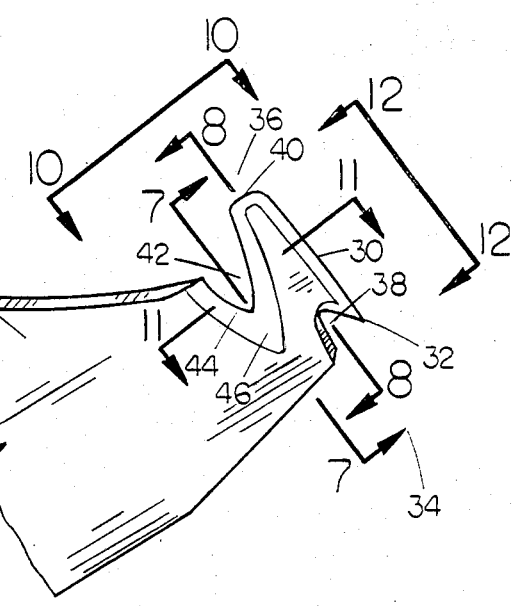
FIG. 2 is a partial perspective view of the end of the knife.

Telephone cables are normally comprised of a plurality of longitudinally extending telephone wires which are enclosed by a protective sheath. The wires are normally covered by a layer of paper which in turn is covered by a thin steel layer approximately 0.008 inches thick. A corrugated aluminum layer extends around the steel layer and is normally approximately 0.006 inches thick. A layer of rubber extends around the corrugated aluminum layer. The knife of this invention which is used to slice through the aluminum and steel layers comprises a handle having a metal blade element extending therefrom which has the cutting surfaces at one end thereof. The knife includes a pointed end portion which is initially extended through the aluminum and steel layers. The knife is then rotated downwardly about the pointed end to properly position the knife. The knife is then pulled longitudinally relative to the cable with a cutting edge on the knife slicing through the aluminum and steel layers. The knife also includes means to limit the penetration of the cutting portions into the cable.

DESCRIPTION OF THE PREFERRED EMBODIMENT

The knife of this invention is referred to generally by the reference numeral 10 while the reference numeral 12 refers to a conventional telephone cable. Cable 12 comprises a plurality of longitudinally extending telephone wires 14 which are normally closed by a layer of paper. For purposes of clarity, the layer of paper has not been shown in the drawings. The layer of paper is enclosed by a sheath means 16 comprising a thin layer of steel 18 and a thin layer of corrugated aluminum 20. Layer 18 is normally approximately 0.008 inches thick while layer 20 is normally approximately 0.006 inches thick. A corrugated configuration of the layer 20 and the steel layer 18 makes it hazardous when cutting the same from the cable since extremely sharp edges will be created which could cause injury to the worker. Layer 20 is normally enclosed by a rubber layer 22. In order to splice the ends of cables together, it is necessary to expose the ends of the wires 14. In normal practice, it is necessary to expose approximately 18 inches of the ends of the wires 14.

Knife 10 comprises a handle portion 24 which is preferably of the configuration illustrated in the drawings but it should be understood that the particular design of the handle is not as important as the particular design of the cutting surfaces although the design of the handle portion 24 provides a means for protecting the worker's hand during the cutting or slicing operation. Blade 26 is secured to handle portion 24 by means of screw assemblies 28. Preferably, blade 26 is comprised of a stainless steel material.

For purposes of description, blade 26 will be described as having an end portion 30, tip or point 32, forward end 34 and rearward end 36. Blade 26 is provided with a generally U-shaped notch 38 extending into the forward end 34 thereof between tip 32 and handle portion 24. End portion 30 is sharpened and tapered as best illustrated in FIG. 12. End 30 terminates in an end portion 40 which is also tapered and sharpened as illustrated in FIG. 8. A notch 42 is formed in the rearward edge of the blade 26 and it can be seen from the drawings that the notch 42 is defined by a tapered and sharpened portion 44 extending therearound. Sharpened portion 44 includes a forwardly extending portion 46 which serves as a guide to limit the penetration of the knife as will be described in more detail hereinafter.

Figure 3:
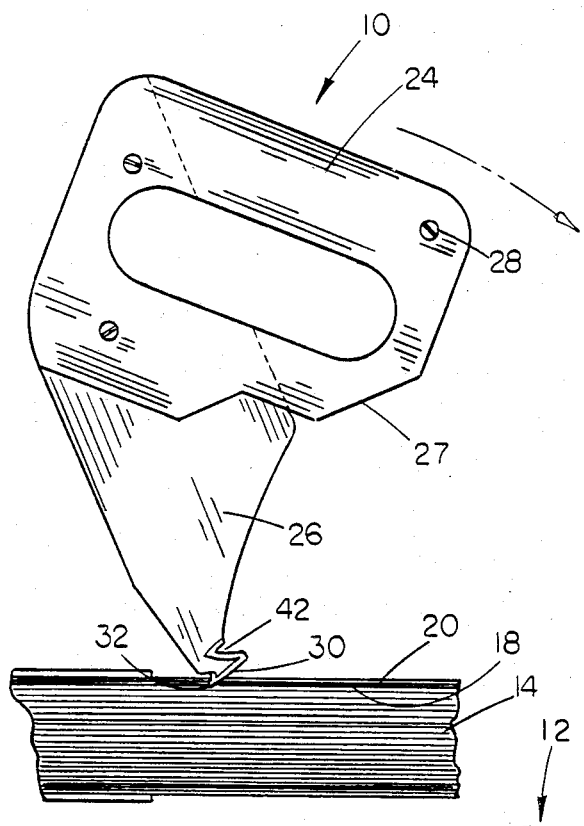
FIG. 3 is a side view illustrating the initial step in cutting through the aluminum and steel layers.
Figure 4:
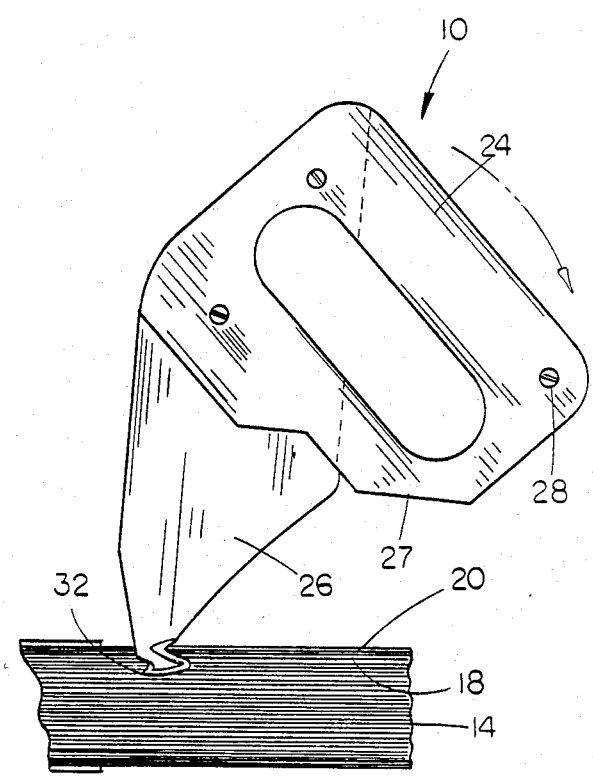
FIG. 4 is a view similar to FIG. 3 except that the knife has completely penetrated through the aluminum and steel.
Figure 5:
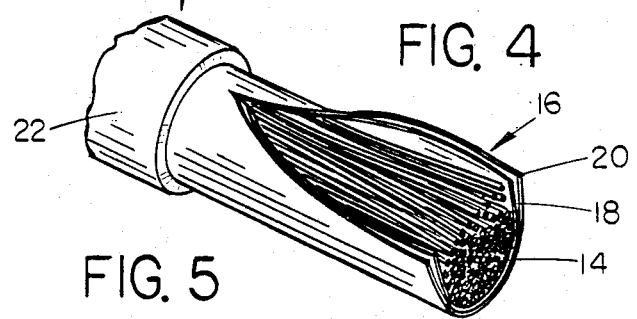
FIG. 5 is a perspective view illustrating a telephone cable after the aluminum and steel layers have been sliced.

In operation, the rubber layer 22 is first removed from the cable for approximately 18 inches. The knife 10 is initially positioned as illustrated in FIG. 3 so that the tip or point 32 engages the exterior surface of the aluminum layer 20. Point 32 is then forced downwardly through the layers 18 and 20. When point 32 has penetrated the layers 18 and 20, the knife is rotated as indicated by the arrows in FIGS. 3 and 4. Rotation of the knife as illustrated by the arrows in FIG. 3 causes the blade to pivot about point 32 which aids in permitting the sharpened portion 30 to cut through the layers 18 and 20. Thus, the point 32 serves as a pivot point as the portion 30 is forced through the layers 20 and 18.

Figure 13:
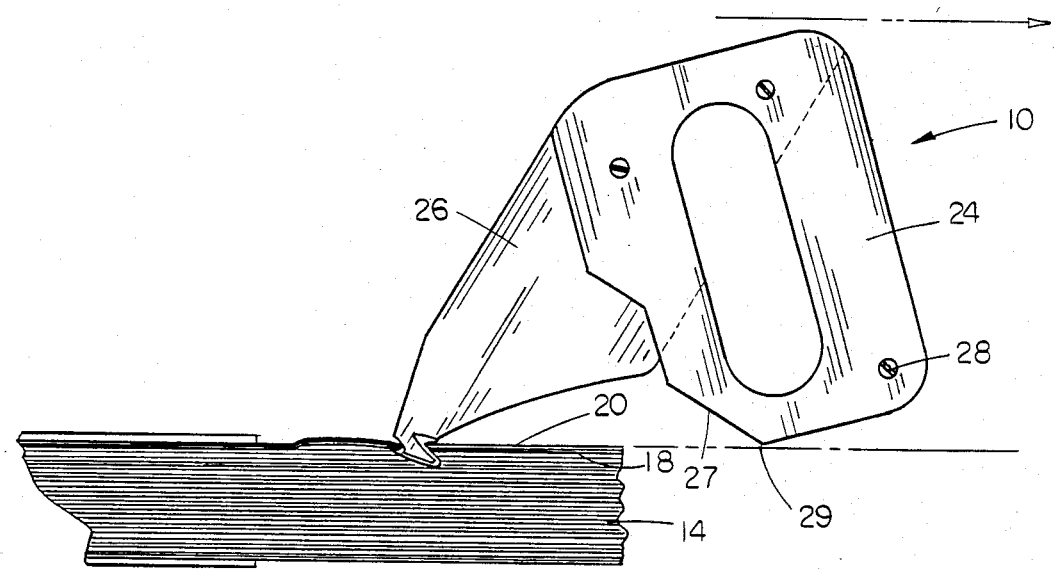
FIG. 13 is a view similar to FIGS. 3 and 4 illustrating the knife being used to slice through the aluminum and steel layers.

The knife is rotated from the position of FIG. 3 to the position of FIG. 13 until the layers 20 and 18 are positioned in the notch 42. The tapered portion 46 serves as a guide to maintain the layers 20 and 18 in the center of the notch 42 to limit the penetration of the knife into the able. The knife is then pulled longitudinally in the direction of the arrow of FIG. 13. As the knife is moved longitudinally with respect to the cable, the layers 20 and 18 are sliced by the sharpened portion 44 extending around notch 42. The knife would be pulled through the layers 18 and 20 until the end of the cable has been reached. The procedure is then repeated approximately two or three times around the circumference of layers 20 and 18 so that three or four strips of the layers are created. The strips are then cut from the cable by any convenient means.

The relationship of the handle portion 24 to notch 42 is also quite important as illustrated in FIG. 13. As the knife is pulled through the sheathing material, the end 29 of tapered portion 27 of handle portion 24 is closely positioned adjacent the cable to enable an efficient pulling force to be exerted on the knife. The alignment of end 29 and notch 42 permits a "straight" longitudinal force to be exerted on the knife. If tapered portion 27 were not provided, it would not be possible to move the handle to the position of FIG. 13.

Thus it can be seen that a novel cable sheath cutter knife has been provided which greatly facilitates the cutting and removal of the metal sheaths of a telephone cable. The knife is designed to permit the rapid slicing of the metal layers without damaging the telephone lines 14 contained within the cable. The knife is not only easy to use but is safe to use. Thus it can be seen that the knife of this invention accomplishes at least all of its stated objectives.

I claim:
1. A cable sheath cutter knife, comprising,
a handle portion,
a blade portion secured to said handle portion and extending downwardly therefrom,
said blade portion having rearward and forward sides and an elongated end portion extended between said rearward and forward sides,
said blade portion having a forwardly directed pointed tip portion on said end portion at the forward end thereof,
said blade portion having a first notch formed therein extending rearwardly into the forward side thereof adjacent said pointed tip portion such that said pointed tip portion partially defines said first notch,
said blade portion having a second notch formed therein extending forwardly into the rearward side thereof defining a leading end portion at the rearward end of said end portion, and
said end portion being tapered to a sharpened edge whereby, upon penetration of a cable sheath by said pointed tip portion and upon downward and forward rotation of said handle about said tip portion, said sharpened end portion is operative to cut through the sheath to position the sheath in the second notch for slicing the sheath in response to rearward movement of the knife along the cable.

2. The knife of claim 1 wherein said blade portion is tapered to a sharpened edge around said second notch to permit the knife to slice through a sheathing material.

3. The knife of claim 2 wherein said tapered portion around said second notch defines a guide means to limit the penetration of the blade portion into the member being cut.

4. The knife of claim 1 wherein said leading end portion is tapered to a sharpened edge.

5. The knife of claim 1 wherein said handle portion has an end portion which is closely positioned to the exterior surface of the cable as said knife is moved rearwardly along the cable, said end portion and said sheath cutting notch being substantially aligned with respect to each other.

* * * * *